US012353528B2

(12) United States Patent
Albero et al.

(10) Patent No.: US 12,353,528 B2
(45) Date of Patent: Jul. 8, 2025

(54) REAL-TIME ADJUSTMENT OF THE VOLUME OF PASSCODE ENTRY AUTHENTICATION ATTEMPTS

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 302 days.

(21) Appl. No.: 18/127,472

(22) Filed: Mar. 28, 2023

(65) Prior Publication Data

US 2024/0330423 A1 Oct. 3, 2024

(51) Int. Cl.
*G06F 21/31* (2013.01)
*G06F 9/451* (2018.01)

(52) U.S. Cl.
CPC ............ *G06F 21/316* (2013.01); *G06F 9/453* (2018.02); *G06F 2221/2113* (2013.01)

(58) Field of Classification Search
CPC .......................... G06F 9/453; G06F 2221/2113
USPC ............................................................ 726/7
See application file for complete search history.

(56) References Cited

U.S. PATENT DOCUMENTS

| | | | |
|---|---|---|---|
| 8,677,465 B2 | 3/2014 | Chaudhry et al. | |
| 8,972,719 B2 | 3/2015 | Shablygin et al. | |
| 9,225,717 B1 | 12/2015 | Brainard et al. | |
| 9,275,219 B2 | 3/2016 | Cross et al. | |
| 9,729,544 B2 | 8/2017 | Camp | |
| 10,540,657 B2 | 1/2020 | Edwards | |
| 10,776,479 B2 | 9/2020 | Chatterton et al. | |

(Continued)

FOREIGN PATENT DOCUMENTS

WO WO-9909512 A1 * 2/1999 ............ G06F 21/32

OTHER PUBLICATIONS

Haque et al., "Authentication through keystrokes: What you type and how you type," 2015 IEEE International Conference on Research in Computational Intelligence and Communication Networks (ICRCICN), Kolkata, India, 2015, pp. 257-261, doi: 10.1109/ICRCICN.2015.7434246. (Year: 2015).*

(Continued)

*Primary Examiner* — Peter C Shaw
(74) *Attorney, Agent, or Firm* — Moore & Van Allen PLLC; Anup Iyer

(57) ABSTRACT

Real-time adjustment of the volume of passcode entry authentication attempts is performed based on systematic determinations of the likelihood that the passcode entrant is the rightful holder/user of the active passcode. Specifically, after an entered passcode has been determined to be incorrect, a determination is made as to the likelihood that the passcode entrant is the rightful holder of the active passcode and, based on such a determination, the number of authentication attempts afforded the passcode entrant is either increased, decreased or exhausted. Systematic determination of the likelihood that the passcode entrant is the rightful holder/user of the active passcode is accomplished by applying predetermined mismatched passcode rules and comparing machine learning (ML)-based user authentication behavior patterns to characteristics of the current authentication attempt.

14 Claims, 5 Drawing Sheets

(56) References Cited

U.S. PATENT DOCUMENTS

| | | | |
|---|---|---|---|
| 11,301,550 B2 | 4/2022 | Grajek et al. | |
| 11,537,699 B2 | 12/2022 | Ballard et al. | |
| 2002/0188854 A1* | 12/2002 | Heaven | H04L 63/0428 713/186 |
| 2004/0172562 A1* | 9/2004 | Berger | G06F 21/316 726/7 |
| 2007/0250920 A1* | 10/2007 | Lindsay | G06F 21/31 726/7 |
| 2009/0158424 A1* | 6/2009 | Yang | G06F 21/36 726/19 |
| 2011/0296513 A1 | 12/2011 | Kasad | |
| 2012/0198530 A1* | 8/2012 | Bodavula | G06F 21/606 726/6 |
| 2016/0292685 A1 | 10/2016 | Kairi | |
| 2018/0247044 A1* | 8/2018 | Liu | G06F 21/36 |
| 2019/0132323 A1 | 5/2019 | Williams et al. | |
| 2019/0165944 A1 | 5/2019 | Sun et al. | |
| 2020/0065506 A1* | 2/2020 | Bugadi | G06F 21/6209 |
| 2022/0224682 A1 | 7/2022 | Cu Castro | |
| 2023/0237138 A1 | 7/2023 | Reina et al. | |

OTHER PUBLICATIONS

D'Lima et al., "Password authentication using Keystroke Biometrics," 2015 International Conference on Communication, Information & Computing Technology (ICCICT), Mumbai, India, 2015, pp. 1-6, doi: 10.1109/ICCICT.2015.7045681. (Year: 2015).*

Handa et al., "A comparative study of Mouse and Keystroke Based Authentication," 2019 9th International Conference on Cloud Computing, Data Science & Engineering (Confluence), Noida, India, 2019, pp. 670-674, doi: 10.1109/CONFLUENCE.2019.8776953. (Year: 2019).*

Idrus et al., "Soft biometrics database: A benchmark for keystroke dynamics biometric systems," 2013 International Conference of the BIOSIG Special Interest Group (BIOSIG), Darmstadt, Germany, 2013, pp. 1-8. (Year: 2013).*

\* cited by examiner

REAL-TIME ADJUSTMENT OF THE VOLUME OF PASSCODE ENTRY AUTHENTICATION ATTEMPTS

FIELD OF THE INVENTION

The present invention is related generally to user authentication security and, more specifically, real-time adjustment of the volume of user authentication attempts based on determinations of the likelihood that the user attempting authentication is the rightful possessor of the current/active passcode.

BACKGROUND

Many applications, services, systems, physical locations and the like require user authentication prior to providing access. One of the more conventional and prevalent means by which a user authenticates is through presentation of a passcode (otherwise referred to as a password or the like), which is a string of characters used for authentication on a digital device. The passcode presented by the user must match the passcode "on file" (i.e., previously stored in memory) in order to authenticate the user and, in turn, grant the user access to the corresponding application, service, system, physical location or the like.

One of the more concerning problems with passcodes is that users tend to forget their passcodes or forget which of the passcodes has been assigned to a corresponding application, service, system or the like. This problem becomes compounded when the applications, services, systems and the like require a certain level of complexity in the number and/or type of characters used to form the passcode. Additionally, a user may have difficulty in correctly inputted a passcode that is lengthy in characters, contains infrequently used characters and/or is obfuscated upon character input.

Many of the applications, services, systems and the like are configured to allow the user a predetermined number of passcode entry authentication attempts before a user is asked to perform other actions, such as, multi-factor authentication, re-setting of the passcode or the like. In certain instances, some applications, services, systems and the like may "lock-out" (forbid the user from accessing the application, service, system or the like) for a designated period of time if the user is unable to successfully present the correct passcode within the allotted number of authentication attempts.

Additionally, unauthorized users (i.e., wrongdoers) may attempt to wrongfully access the applications, services, systems by providing a random passcode or a passcode they believe has been used in the past by a known user. For example, a data breach may lead to usernames and passcodes being publicly exposed. As a result of such a data breach, unauthorized users/wrongdoers, who are aware that users typically use the same or similar passcodes, may attempt to use these passcodes or variations thereof to access various other applications, services and systems and the like. In this regard, applications, services, systems and the like that are configured to allow a user a predetermined number of passcode entry authentication attempts may benefit from decreasing the number of attempts or forbidding further attempts altogether if they can readily deduce that the initial passcode entry authentication attempt is (or is likely) coming from an unauthorized user/wrongdoer.

Therefore, a need exists to develop systems, methods, computer program products and the like which provide for making it easier for a user to authenticate in the event that the user fails to recall their passcode or fails to properly enter their passcode. In addition, systems, methods, computer program products and the like should serve to prevent unauthorized users from gaining access to an application, service, system or the like by prohibiting the unauthorized user from performing multiple passcode entry authentication attempts.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for real-time adjustment of the volume/number of passcode entry authentication attempts based on systematic determinations of the likelihood that the passcode entrant (heretofore, the "user") is the rightful holder/user of the active passcode (i.e., the active passcode currently assigned to the rightful holder/user). In this regard, after an entered passcode has been determined to be incorrect (i.e., does not match the active/stored passcode), a determination is made as to the likelihood that the passcode entrant is the rightful holder of the active passcode and, based on such a determination, the number of authentication attempts afforded the passcode entrant is adjusted. "Real-time" adjustments means that the adjustments occur during the user's current login/authentication session. Adjustments may include increasing the number/volume of passcode entry/authentication attempts if the likelihood is such that the passcode entrant is the rightful holder of the active passcode and decreasing the number/volume of passcode entry/authentication attempts (or, in some instances, forbidding further passcode entry/authentication attempts) if the likelihood is such that the passcode entrant is not the rightful holder of the active passcode.

Systematic determination of the likelihood that the passcode entrant is the rightful holder/user of the active passcode is accomplished by applying predetermined mismatched passcode rules and comparing machine learning (ML)-based user authentication behavior patterns to characteristics of the current authentication attempt. For examples, the predetermined mismatched passcode rules may relate to common user input errors, previous passcodes used by the rightful holder of the passcode, proximity in time and/or location to known times and/or locations at which the rightful holder of the passcode normally attempts authentication and the like. In other examples, the user authentication behavior patterns, which are rightful holder-specific, may be related to the historical rate of errors committed by the rightful possessor during previous authentication attempts, the historical rate/speed of input at which the rightful possessor enters the passcode, the historical amount of pressure applied to the input device during rightful possessor entry of the passcode, historical times and/or physical locations at which the rightful possessor customarily performs authentication.

Moreover, such systematic determinations may occur after every passcode entry/authentication attempt. This means that the number/volume of authentication attempts may be adjusted/varied after any and, in some instances, all authentication attempts based on changes in the likelihood that the passcode entrant is the rightful holder/user of the active passcode.

In further embodiments of the invention, if a determination is made that the likelihood is such that the passcode entrant is the rightful holder of the active passcode, passcode remembrance assistance may be provider to the passcode entrant as a means of assisting the passcode entrant in remembering the passcode and expediating the authentication process. Passcode remembrance assistance may include, but is not limited to, indicating, such as highlighting, which character or characters in the entered passcode are incorrect, indicating the number of characters that the passcode entrant has correct or incorrect, indicating a level of correctness (e.g., hot/cold indicator) for each authentication attempt and the like.

A system for real-time adjustment of a volume of user authentication attempts defines first embodiments of the system. The system includes a database that stores a plurality of mismatched passcode rules. The system further includes a first computing platform having a first memory and one or more first computing device processors in communication with the first memory. The first memory stores one or more machine learning models that are executable by at least one of the one or more first computing device processor. The machine learning models are configured to determine one or more user authentication behavior patterns. Additionally, the system includes a second computing platform having a second memory and one or more second computing device processors in communication with the second memory. The second memory stores an authentication application that is executable by at least one of the one or more second computing device processors. The authentication application is configured to receive, from a user, input of a passcode that defines an initial authentication attempt for authenticating the user for purposes of gaining accessing to an application, a service or a physical location and determine that the passcode does not match a currently active passcode associated with the user. In response to determining that the passcode does not match the currently active passcode, the authentication application is further configured to (i) implement the mismatched passcode rules and (ii) compare the one or more user authentication behavior patterns to characteristics of the input of the passcode to determine a likelihood that the user is a rightful holder of the currently active passcode. Further, the authentication application is configured to adjust, from a baseline volume, a volume of further authentication attempts afforded to the user based on the determined likelihood that the user is the rightful holder of the currently active passcode.

In specific embodiments of the system, the authentication application is further configured to provide passcode remembrance assistance to the user based on the determined likelihood that the user is the rightful holder of the currently active passcode exceeding a predetermined likelihood threshold. Passcode remembrance assistance may include, but is not limited to, at least one of (i) an indication of which characters in the inputted passcode are incorrect, (ii) an indication of a number of correct or incorrect characters in the inputted passcode, (iii) an indication of a level of correctness to the currently active passcode (i.e., how close the user is to the correct/active passcode) for each further authentication attempt.

In further specific embodiments of the system, the mismatched passcode rules include at least one of rules related to (i) common user input errors, (ii) previous passcodes associated with the user, and (iii) proximity in time and location to known times and locations at which the user customarily conducts authentication attempts for gaining accessing to the application, the service or the physical location.

In additional specific embodiments of the system, the one or more machine learning models are configured to determine one or more user authentication behavior patterns that are related to at least one (i) a historical rate of errors that the user experiences in providing input of the passcode, (ii) historical speed of input at which a passcode is entered by the user, and (iii) historical amount of pressure applied by the user at point of input when inputting the passcode, and (iv) historical times and geolocations at which the user customarily conducts authentication attempts for gaining accessing to the application, the service or the physical location.

In additional specific embodiments of the system, the authentication application is further configured to receive, from the user, input of a second passcode that defines a subsequent authentication attempt for authenticating the user for purposes of gaining accessing to the application, the service or the physical location and determine that the second passcode does not match a currently active passcode associated with the user. In response to determining that the second passcode does not match the currently active passcode, the authentication application is further configured to (i) implement the mismatched passcode rules and (ii) compare the one or more user authentication behavior patterns to characteristics of the input of the second passcode to determine a likelihood that the user is a rightful holder of the currently active passcode. In addition, the authentication application is further configured to re-adjust the volume of the further authentication attempts afforded to the user based on the determined likelihood that the user is the rightful holder of the currently active passcode.

In additional specific embodiments of the system, the baseline volume is user-specific. In specific related embodiments of the system, the baseline volume is user-specific based on a user authentication behavior pattern from amongst the one or more user authentication patterns.

Moreover, in further specific embodiments of the system, the authentication application is further configured to adjust, from the baseline volume, a volume of further authentication attempts afforded to the user, wherein adjusting comprises one of increasing or decreasing the volume of further authentication attempts or forbidding further authentication attempts. In related embodiments of the system, in which adjusting the volume of further authentication attempts comprises forbidding further authentication attempts, the authentication is further configured to perform at least one of requiring the user to (i) successfully perform a multi-factor authentication process to gain access accessing to the application, the service or the physical location, and (ii) change the currently active passcode.

A computer-implementing method for real-time adjustment of a volume of user authentication attempts defines second embodiments of the invention. The method is executed by one or more computing processor devices. The method includes receiving, from a user, input of a passcode that defines an initial authentication attempt for authenticating the user for purposes of gaining accessing to an application, a service or a physical location, and determining that the passcode does not match a currently active passcode associated with the user. In response to determining that the passcode does not match the currently active passcode, the method further includes (i) implementing mismatched passcode rules and (ii) comparing one or more user authentication behavior patterns resulting from machine learning models to characteristics of the input of the passcode to determine a likelihood that the user is a rightful holder of the currently active passcode. In addition, the method includes adjusting, from a baseline volume, a volume of further authentication attempts afforded to the user based on the determined likelihood that the user is the rightful holder of the currently active passcode.

In further specific embodiments the computer-implemented method further included providing passcode remembrance assistance to the user based on the determined likelihood that the user is the rightful holder of the currently active passcode exceeding a predetermined likelihood threshold. The password remembrance assistance is selected from the group consisting of (i) indication of which characters in the inputted passcode are incorrect, (ii) indication of a number of correct or incorrect characters in the inputted passcode, and (iii) indication of a level of correctness to the currently active passcode for each further authentication attempt.

In other specific embodiments of the computer-implemented method, comparing the one or more user authentication behavior patterns resulting from machine learning models to characteristics of the input of the passcode further includes comparing the one or more user authentication behavior patterns including a user authentication behavior pattern related to at least one of (i) a historical rate of errors that the user experiences in providing input of the passcode, (ii) historical speed of input at which a passcode is entered by the user, (iii) historical pressure applied by the user at point of input when inputting the passcode, and (iv) historical times and geolocations at which the user customarily conducts authentication attempts for gaining accessing to the application, the service or the physical location.

A computer program product including a non-transitory computer-readable medium defines third embodiments of the invention. The computer-readable medium includes a set of codes for causing one or more computing processing devices to receive, from a user, input of a passcode that defines an initial authentication attempt for authenticating the user for purposes of gaining accessing to an application, a service or a physical location. In addition, the computer-readable medium includes a set of codes for causing one or more computing processing devices to determine that the passcode does not match a currently active passcode associated with the user. In response to determining that the passcode does not match the currently active passcode, the computer-readable medium includes a set of codes for causing one or more computing processing devices to (i) implement mismatched passcode rules and (ii) compare one or more user authentication behavior patterns resulting from machine learning models to characteristics of the input of the passcode to determine a likelihood that the user is a rightful holder of the currently active passcode. Further, the computer-readable medium includes a set of codes for causing one or more computing processing devices to adjust, from a baseline volume, a volume of further authentication attempts afforded to the user based on the determined likelihood that the user is the rightful holder of the currently active passcode.

In specific embodiments of the computer program product, the sets of codes further include a set of codes for causing the one or computing processor devices to provide passcode remembrance assistance to the user based on the determined likelihood that the user is the rightful holder of the currently active passcode exceeding a predetermined likelihood threshold, wherein the password remembrance assistance is selected from the group consisting of (i) indication of which characters in the inputted passcode are incorrect, (ii) indication of a number of correct or incorrect characters in the inputted passcode, and (iii) indication of a level of correctness to the currently active passcode for each further authentication attempt.

In other specific embodiments of the computer program product, the set of codes for causing the one or more processors to compare the one or more user authentication behavior patterns resulting from machine learning models to characteristics of the input of the passcode are further configured to cause the one or more processors to compare the one or more user authentication behavior patterns including a user authentication behavior pattern related to at least one of (i) a historical rate of errors that the user experiences in providing input of the passcode, (ii) historical speed of input at which a passcode is entered by the user, (iii) historical pressure applied by the user at point of input when inputting the passcode, and (iv) historical times and geolocations at which the user customarily conducts authentication attempts for gaining accessing to the application, the service or the physical location.

Thus, according to embodiments of the invention, which will be discussed in greater detail below, the present invention provides for real-time adjustment of the volume/number of passcode entry authentication attempts based on systematic determinations of the likelihood that the passcode entrant is the rightful holder/user of the active passcode. In this regard, after an entered passcode has been determined to be incorrect, a determination is made as to the likelihood that the passcode entrant is the rightful holder of the active passcode and, based on such a determination, the number of authentication attempts afforded the passcode entrant is adjusted. Systematic determination of the likelihood that the passcode entrant is the rightful holder/user of the active passcode is accomplished by applying predetermined mismatched passcode rules and comparing machine learning (ML)-based user authentication behavior patterns to characteristics of the current authentication attempt.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
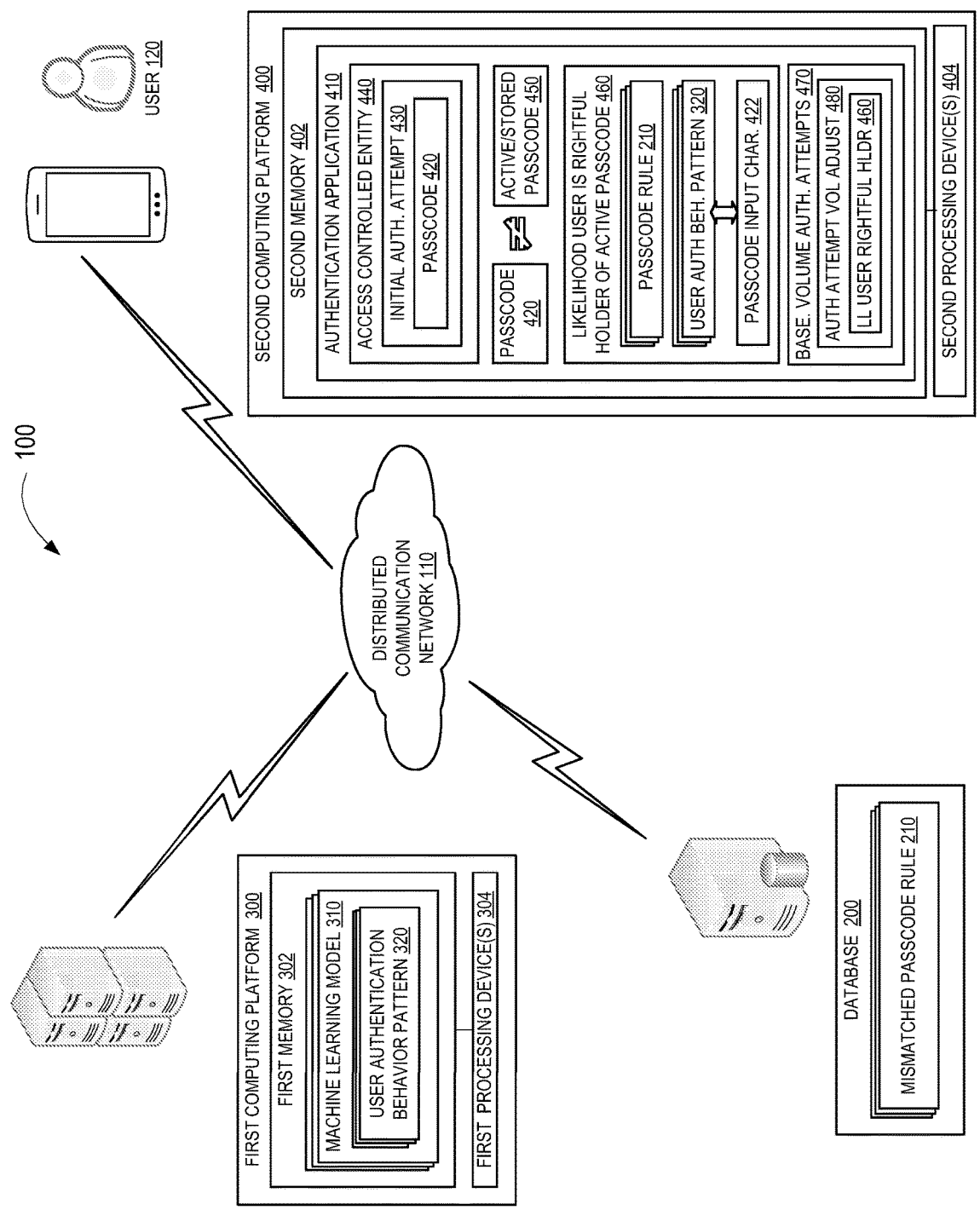
Figure 2:
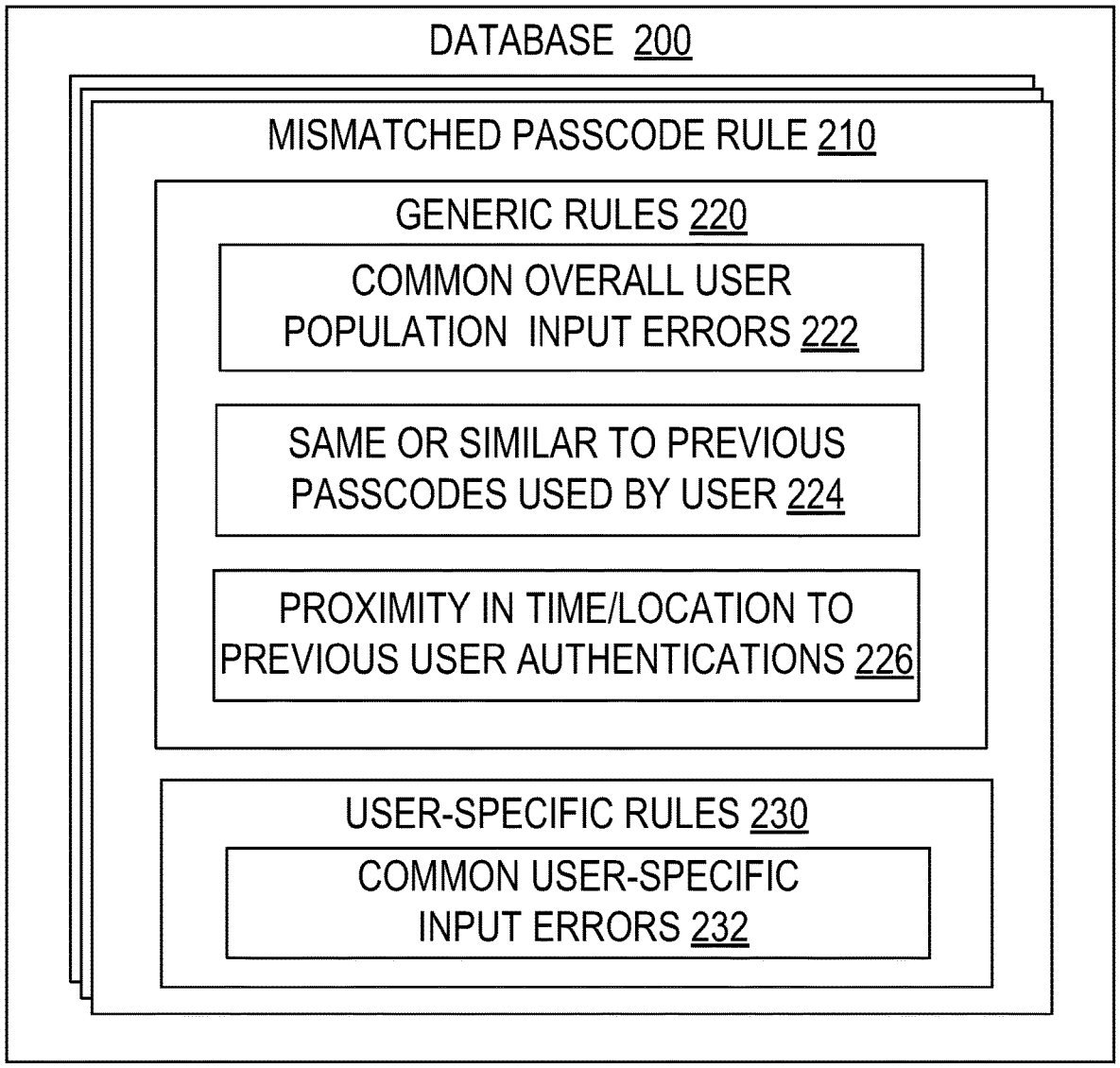
Figure 3:
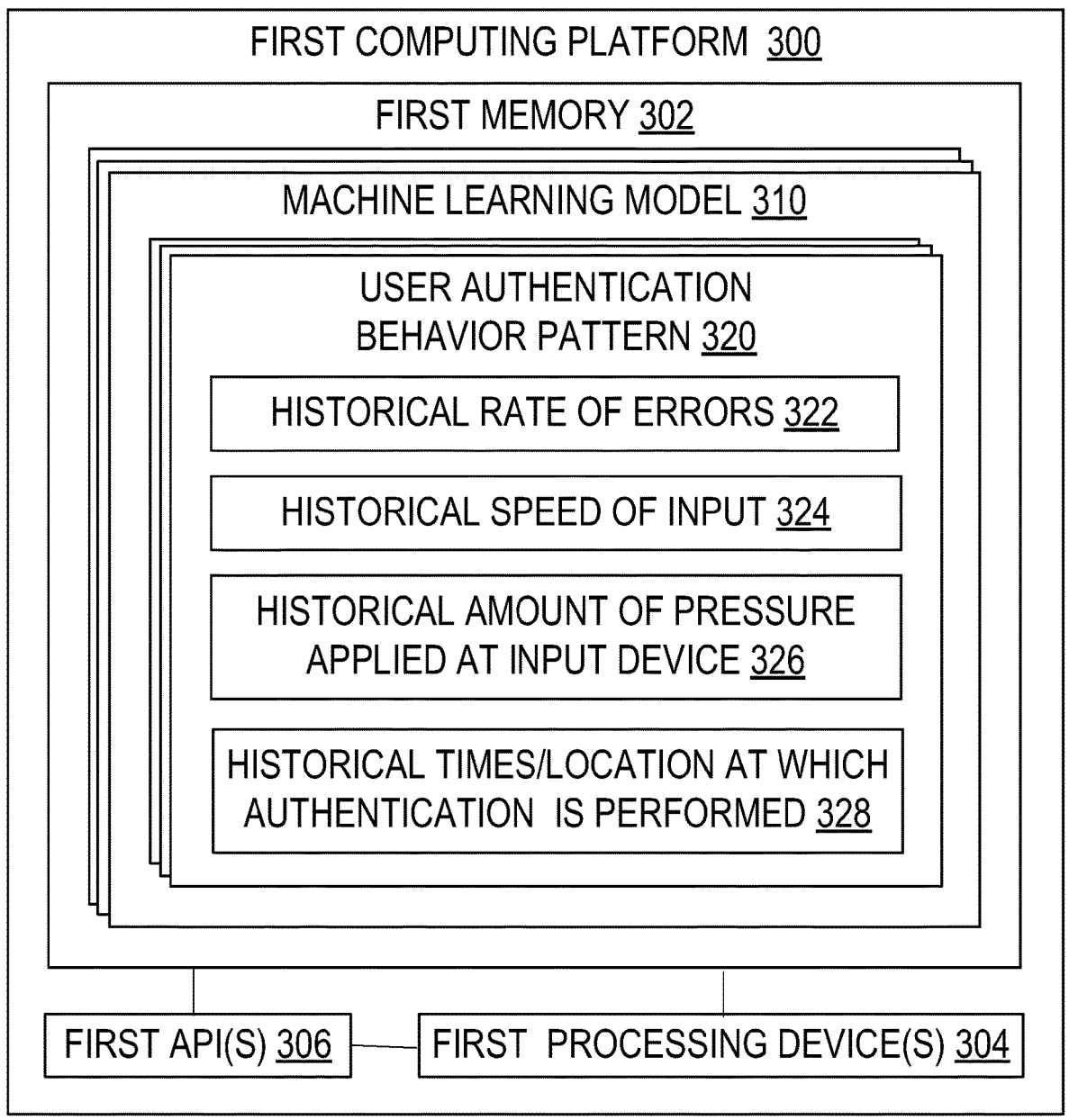
Figure 4:
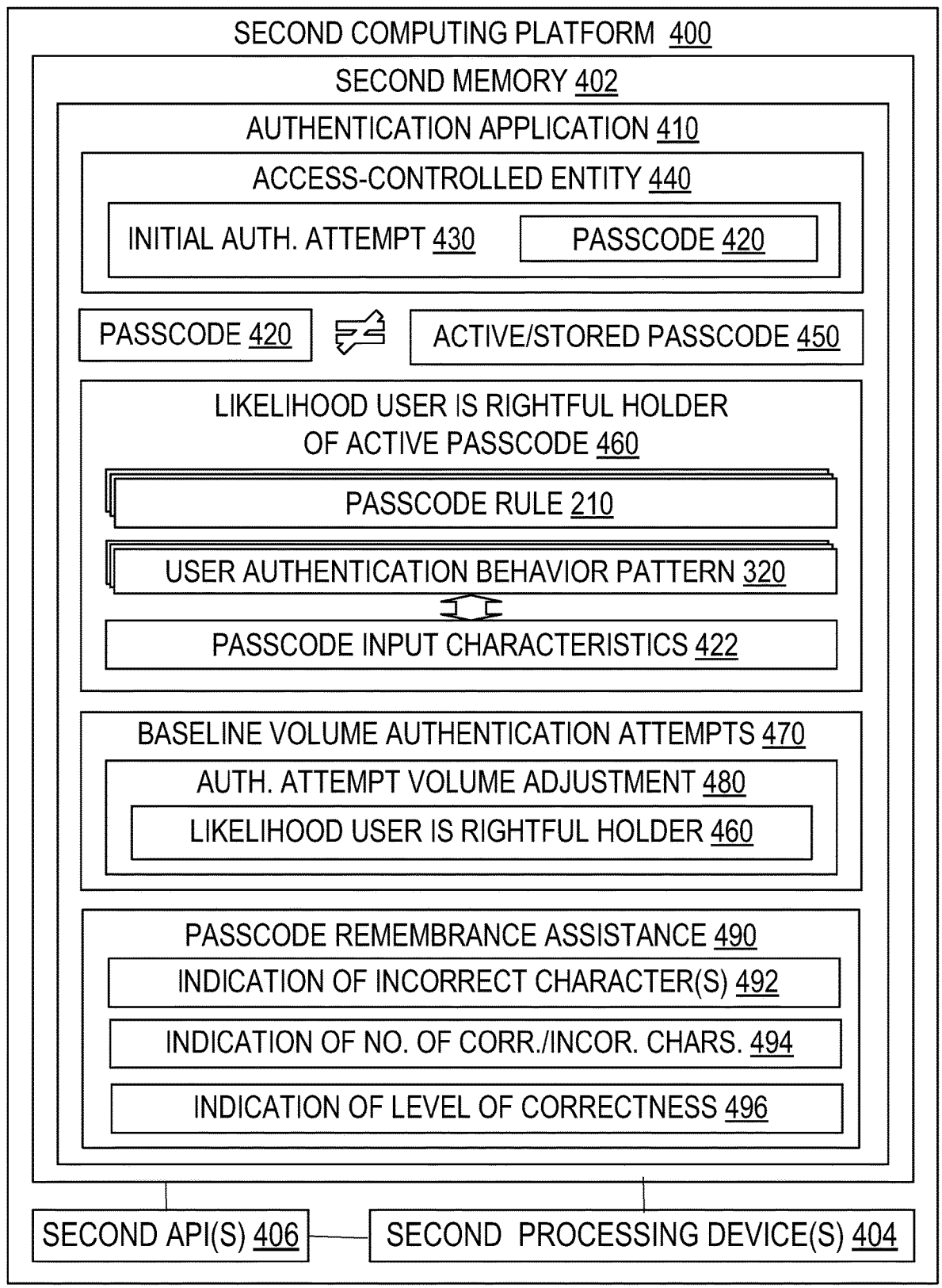
Figure 5:
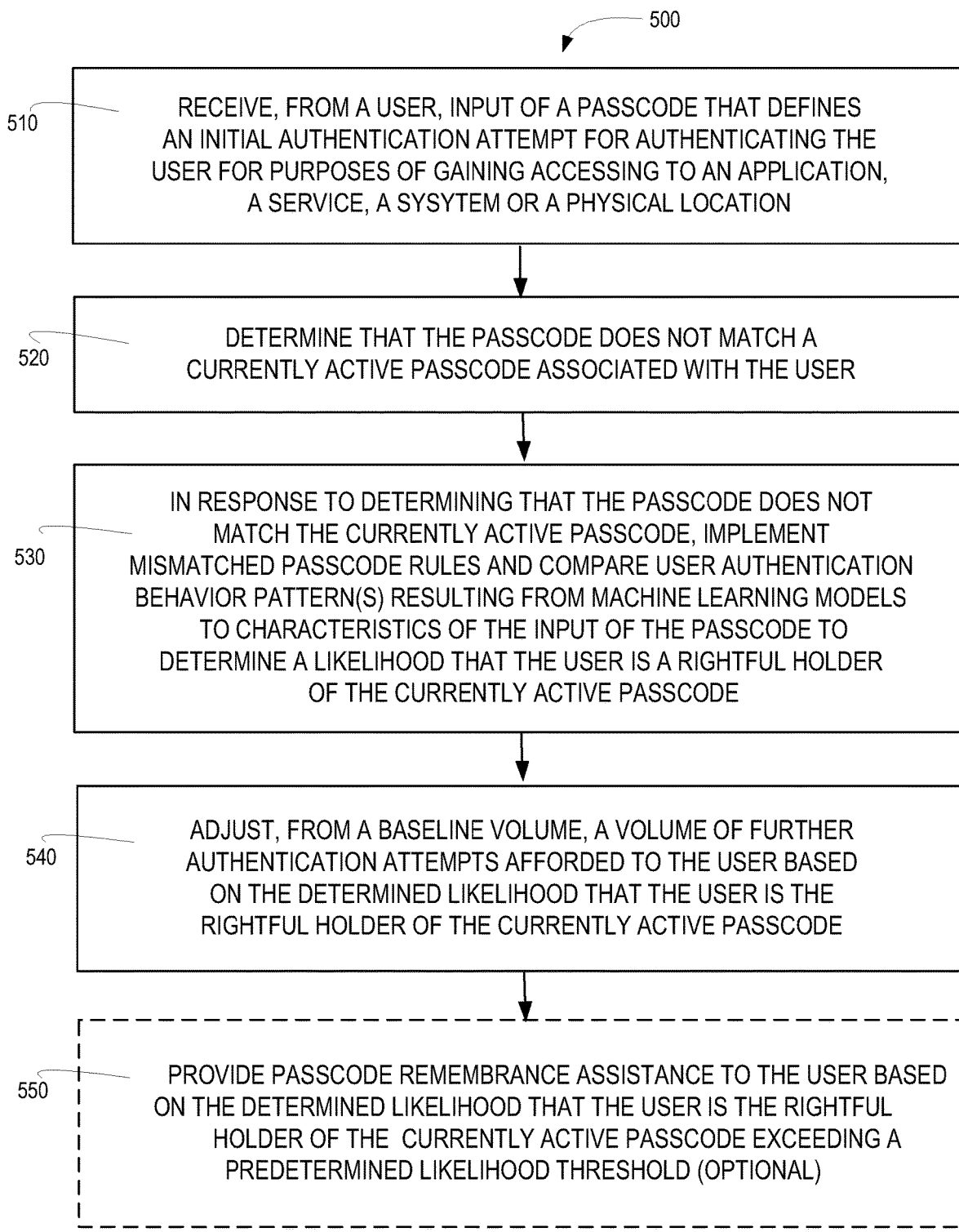

Having thus described embodiments of the disclosure in general terms, reference will now be made to the accompanying drawings, wherein:

FIG. 1 is a schematic/block diagram of system for real-time adjustment of a volume of user authentication attempts, in accordance with embodiments of the present invention;

FIG. 2 is a block diagram of a database including mismatched passcode rules within a system for real-time adjustment of a volume of user authentication attempts, in accordance with embodiments of the present invention;

FIG. 3 is a block diagram of a computing platform including machine learning models configured for determining user authentication behavior patterns, in accordance with embodiments of the present invention;

FIG. 4 is a block diagram of a computing platform including an authentication application configured for real-time adjustment of a volume of user authentication attempts, in accordance with embodiments of the present invention; and FIG. 5 is a flow diagram of a method for real-time adjustment of a volume of user authentication attempts, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing computer-executable program code embodied in computer-readable medium, and/or by having one or more application-specific circuits perform the function.

Thus, according to embodiments of the invention, which will be described in more detail below, systems, methods and computer program products are disclosed that provide for real-time adjustment of the volume/number of passcode entry authentication attempts based on systematic determinations of the likelihood that the passcode entrant (heretofore, the "user") is the rightful holder/user of the active passcode (i.e., the active passcode currently assigned to the rightful holder/user). In this regard, after an entered passcode has been determined to be incorrect (i.e., does not match the active/stored passcode), a determination is made as to the likelihood that the passcode entrant is the rightful holder of the active passcode and, based on such a determination, the number of authentication attempts afforded the passcode entrant is adjusted. "Real-time" adjustments means that the adjustments occur during the user's current login/authentication session. Adjustments may include increasing the number/volume of passcode entry/authentication attempts if the likelihood is such that the passcode entrant is the rightful holder of the active passcode and decreasing the number/volume of passcode entry/authentication attempts (or, in some instances, forbidding further passcode entry/authentication attempts) if the likelihood is such that the passcode entrant is not the rightful holder of the active passcode. The adjustments to the authentication attempts may be made to a baseline volume of authentication attempts, which may a generic baseline (employed across all users) or a user-specific baseline, which may change over time and be determined based on the user's specific authentication behavior patterns, such as historical rate of errors/incorrect authentication attempts or the like.

Systematic determination of the likelihood that the passcode entrant is the rightful holder/user of the active passcode is accomplished by applying predetermined mismatched passcode rules and comparing machine learning (ML)-based user authentication behavior patterns to characteristics of the current authentication attempt. For examples, the predetermined mismatched passcode rules may relate to common user input errors, previous passcodes used by the rightful holder of the passcode, proximity in time and/or location to known times and/or locations at which the rightful holder of the passcode normally attempts authentication and the like. In other examples, the user authentication behavior patterns, which are rightful holder-specific, may be related to the historical rate of errors committed by the rightful possessor during previous authentication attempts, the historical rate/speed of input at which the rightful possessor enters the passcode, the historical amount of pressure applied to the input device during rightful possessor entry of the passcode, historical times and/or physical locations at which the rightful possessor customarily performs authentication. If this regard, the likelihood that the passcode entrant is the rightful holder/user of the active passcode may be score or other indicator determined based on numerous factors, with the factors being weighted so based on their level of importance in assessing the likelihood that the passcode entrant is the rightful holder/user of the active passcode.

Moreover, such systematic determinations may occur after every passcode entry/authentication attempt. This means that the number/volume of authentication attempts may be adjusted/varied after any and, in some instances, all authentication attempts based on changes in the likelihood that the passcode entrant is the rightful holder/user of the active passcode.

In further embodiments of the invention, if a determination is made that the likelihood is such that the passcode entrant is the rightful holder of the active passcode, passcode remembrance assistance may be provider to the passcode entrant as a means of assisting the passcode entrant in remembering the passcode and expediating the authentication process. Passcode remembrance assistance may include, but is not limited to, indicating, such as highlighting, which character or characters in the entered passcode are incorrect, indicating the number of characters that the passcode entrant has correct or incorrect, indicating a level of correctness (e.g., hot/cold indicator) for each authentication attempt and the like.

Referring to FIG. 1, a schematic/block diagram is presented of a system 100 for real-time adjustment of a volume of user authentication attempts, in accordance with embodiments of the invention. The system 100 is implemented within a distributed communication network 110, which may include the Internet, one or more intranets, one or more cellular networks or the like. The system 100 includes a database 200 which stores one or more mismatched passcode rules 210 that are configured for implementation as a result of determining that an entered passcode does not match the current/active passcode (i.e., the passcode stored in memory). The term "database" as used herein refers to any memory unit that stores data, in this instance, mismatched passcode rules 210.

System 100 additionally includes first computing platform 300, which comprises first memory 302 and one or more first processing devices 302 that are in communication with first memory 302. First memory 302 stores one or more machine learning (ML) models that are configured to determine (e.g., learn over time) user authentication behavior patterns 320. user authentication behavior patterns 320 define how a user typically performs user authentication and/or ongoing trends in the user's authentication process.

Additionally, system 100 includes second computing platform 400, which comprises second memory 402 and one or more second processing devices 402 that are in communication with first memory 402. First memory 402 stores authentication application 410 which is configured for authenticating (otherwise referred to as "logging on") user 120 for purposes of accessing an application, service, system, physical location or the like. Authentication application 410 may be a standalone application or may be integrated within the within application, service or system to which user 120 is requesting access. Moreover, the functionality of authentication application 410 described herein may be performed within a user device and/or or within a network device; as such, according to embodiments of the present invention second computing platform may comprise a user device such as a mobile communication device (e.g., smart phone) as depicted in FIG. 1, a network device, such as an application server or both a user device and a network device.

Authentication application 410 is configured to receive, from user 120, input of a passcode 420 (i.e., a string of alphanumeric characters) that defines an initial authentication attempt 430 for purposes of gaining access to an application, service, system, physical location (collectively referred to as "access-controlled entity" 440). Subsequently, authentication application 410 determines that passcode 420 does not match the currently active passcode 450 stored in application memory and associated with the user 120. In response to determining that passcode 420 does not match active passcode 450, authentication application 460 is configured to implement the mismatched passcode rules 210 and compare the one or more user authentication behavior patterns 320 to current user passcode input characteristics 422 to determine a likelihood 460 that the user 120 is a rightful holder of the currently active passcode (i.e., the user 120 that input the passcode 450 is the authorized user). The likelihood may be a rating, score or percentage based on the various mismatched passcode rules 210 and the comparison of the known user authentication behavior patterns 320 to current user passcode input characteristics 422.

Further, authentication application 410 is configured to perform an authentication attempt volume adjustment 480 based on the determined likelihood 460 that the user is the rightful holder of the currently active passcode. Authentication attempt volume adjustment 480 is made from a baseline volume of authentication attempts 470. For example, if the baseline volume of authentication attempts allotted to the user 120 is three, authentication attempt volume adjustment 480 may provide for an increase (i.e., more than three authentication attempts) if the likelihood 460 is high and/or above a predetermined likelihood threshold or a decrease (i.e., less than three authentication attempts) if the likelihood 460 is low or below a predetermined likelihood threshold. Once the allotted volume of authentication attempts is reached by the user without a match occurring, the user 120 is prohibited from performing additional attempts and is either prohibited from accessing the access-controlled entity 440 or further authentication means (e.g., multi-factored authentication) are required to gain access. In specific embodiments of the invention, in which the likelihood 460 is unusually low (e.g., below a second predetermined threshold), authentication attempt volume adjustment 480 may provide for forbidding any further authentication attempts 470 (i.e., adjustment to zero further authentication attempts).

Referring to FIG. 2 a block diagram is presented of database 200 configured for storing mismatched passcode rule(s) 210. In accordance with embodiments of the invention, mismatched passcode rules 210 may be generic rules, applicable to all users or user-specific rules 230, applicable to the user 120 currently requesting access. Generic rules 220 may include common overall user population input errors (i.e., typographic errors) 222, for example inputting "I" as opposed "L" or vice versa, inputting "3" instead of "E" or vice versa and the like. Further, generic rules 220 may include same or similar previous passcode used by user 224 (i.e., what should be consider as similar to a previous passcode or how many or the maturity of previous passcodes that should be considered). Moreover, generic rules 220 may include location/time proximity rules 226 that indicate how close in time and/or location authentication attempt should be to times/locations of previous authentication attempts before the authentication attempt is considered to be suspect. User previous-specific rules 230 may include common user-specific input errors 232 (i.e., errors that user 120 commonly commits) and the like.

Referring to FIG. 3, a block diagram is presented of first computing platform 300, which may comprise one or multiple devices, such as application servers, or the like. First computing platform 300 includes first memory 302, which may comprise volatile and/or non-volatile memory, such as read-only and/or random-access memory (RAM and ROM), EPROM, EEPROM, flash cards, or any memory common to computing platforms). Moreover, first memory 302 may comprise cloud storage, such as provided by a cloud storage service and/or a cloud connection service.

Further, first computing platform 300 includes one or more first processing devices 304, which may be an application-specific integrated circuit ("ASIC"), or other chipset, logic circuit, or other data processing device. First processing device(s) 304 may execute one or more first application programming interface (APIs) 306 that interface with any resident programs, such as machine-learning models 310 or the like, stored in first memory 302 of first computing platform 300 and any external programs. First processing devices(s) 304 may include various processing subsystems (not shown in FIG. 3) embodied in hardware, firmware, software, and combinations thereof, that enable the functionality of first computing platform 300 and the operability of first computing platform 300 on a distributed communication network 110 (shown in FIG. 1), such as the Internet, intranet(s), cellular network(s), and the like. For example, processing subsystems allow for initiating and maintaining communications and exchanging data with other networked devices. For the disclosed aspects, processing subsystems of first computing platform 300 may include any subsystem used in conjunction with machine learning models 310 and related tools, routines, sub-routines, algorithms, sub-algorithms, sub-modules thereof.

In specific embodiments of the present invention, first computing platform 300 additionally includes a communications module (not shown in FIG. 3) embodied in hardware, firmware, software, and combinations thereof, that enables electronic communications between first computing platform 300 and other networks and network devices, such as second computing platform 400. Thus, communication module may include the requisite hardware, firmware, software and/or combinations thereof for establishing and maintaining a network communication connection with one or more devices and/or networks.

As previously discussed, first memory 310 of first computing platform 300 stores machine learning models 310 that configured to determine/learn, over time, user authentication behavior patterns 320 based on previous passcode input characteristics associated with the user. For example, user authentication behavior patterns 320 may include, but are not limited to, historical rate of errors 322 (i.e., wrong passcode entries) made by the user. It should be noted that the rate of errors may be a consistent rate or the rate may show an increase or decrease in the level of errors. Further, user authentication behavior patterns 320 may include, but are not limited to, historical speed of input 324 (i.e., time required to provide passcode input) and/or historical amount of pressure applied at input device (i.e., pressure of keystrokes or at touchscreen applied by user when inputting passcode). Moreover, user behavior authentication patterns 320 may include, but are not limited to, historical time/locations patterns at which the user authentication is performed. It should be noted that the time/location patterns may indicate consistent times and/or locations or may indicate a progression in time and/or location (e.g., continual authentication attempts at later or earlier times or at distances progressively further away from the normal location(s)).

Referring to FIG. 4, a block diagram is presented of second computing platform 400, which, as previously discussed may comprise one or multiple devices, such as user devices (e.g., mobile device, laptops, PCs or the like), application servers, or the like. Second computing platform 400 includes second memory 402, which may comprise volatile and/or non-volatile memory, such as read-only and/or random-access memory (RAM and ROM), EPROM, EEPROM, flash cards, or any memory common to computing platforms). Moreover, second memory 402 may comprise cloud storage, such as provided by a cloud storage service and/or a cloud connection service.

Further, second computing platform 400 includes one or more second processing devices 404, which may be an application-specific integrated circuit ("ASIC"), or other chipset, logic circuit, or other data processing device. Second processing device(s) 404 may execute one or more second application programming interface (APIs) 406 that interface with any resident programs, such as authentication application 410 or the like, stored in second memory 402 of second computing platform 400 and any external programs. Second processing devices(s) 404 may include various processing subsystems (not shown in FIG. 4) embodied in hardware, firmware, software, and combinations thereof, that enable the functionality of second computing platform 400 and the operability of second computing platform 400 on a distributed communication network 110 (shown in FIG. 1), such as the Internet, intranet(s), cellular network(s), and the like. For example, processing subsystems allow for initiating and maintaining communications and exchanging data with other networked devices. For the disclosed aspects, processing subsystems of second computing platform 400 may include any subsystem used in conjunction with authentication application 410 and related tools, routines, sub-routines, algorithms, sub-algorithms, sub-modules thereof.

In specific embodiments of the present invention, second computing platform 400 additionally includes a communications module (not shown in FIG. 4) embodied in hardware, firmware, software, and combinations thereof, that enables electronic communications between second computing platform 400 and other networks and network devices, such as first computing platform 300. Thus, communication module may include the requisite hardware, firmware, software and/or combinations thereof for establishing and maintaining a network communication connection with one or more devices and/or networks.

As previously discussed, second memory 410 of second computing platform 400 stores authentication application 410 that is configured to authenticate (i.e., log-in) a user for purposes of gaining access to an application, service, system, physical location or the like. As previously discussed, authentication application 410 may be a standalone application or may be configured as part of (i.e., a sub-component) of the application, service or system requiring authentication.

Authentication application 410 is configured to receive, from user 120 (shown in FIG. 1), input of a passcode 420 (i.e., a string of alphanumeric characters) that defines an initial authentication attempt 430 for purposes of gaining access to access-controlled entity 440 (e.g., an application, service, system, physical location or the like). Subsequently, authentication application 410 determines that passcode 420 does not match the currently active passcode 450 stored in application memory and associated with the user 120. In response to determining that passcode 420 does not match the active passcode 450, authentication application 460 is configured to implement the mismatched passcode rules 210 and compare the one or more user authentication behavior patterns 320 to current user passcode input characteristics 422 to determine a likelihood 460 that the user 120 is a rightful holder of the currently active passcode (i.e., the user 120 that input the passcode 450 is the authorized user). The likelihood may be a rating, score or percentage based on the various mismatched passcode rules 210 and the comparison of the known user authentication behavior patterns 320 to current user passcode input characteristics 422.

Further, authentication application 410 is configured to perform an authentication attempt volume adjustment 480 based on the determined likelihood 460 that the user is the rightful holder of the currently active passcode. Authentication attempt volume adjustment 480 is made from a baseline volume of authentication attempts 470. The baseline volume may be generic (i.e., the same across all users) or may be user-specific based on historical patterns of previous authentication attempts of the user (e.g., the user normally makes input errors, so that their user-specific baseline volume of authentication attempts may be higher than other users' volume of authentication attempts).

As previously discussed, adjustment 480 may include increasing the amount of authentication attempts or decreasing the amount of authentication attempts, including, in some instances, forbidding any further authentication attempts. In those embodiments of the invention in which further authentication attempts are forbidden or the maximum number of adjusted authentication attempts has been reached, the user may be barred from accessing the entity 440 or required to perform other authentication means, such as multi-factored/two-device authentication or the like.

It should also be noted that in specific embodiments of the invention, all subsequent authentication attempts after the initial authentication attempt 430 will be subject to another determination of the likelihood 460 that the user is a rightful holder of the currently active passcode in the event that the subsequently entered passcode does not match the active passcode 450. In response to this determination of the likelihood 460 that the user is a rightful holder of the currently active passcode, authentication application 410 is configured to re-adjust the volume of authentication attempts if this determination of the likelihood 460 warrants such. In other words, if the determination of the likelihood 460 that the user is a rightful holder of the currently active passcode is unchanged from a last-in-time determination of the likelihood 460 that the user is a rightful holder of the currently active passcode, no readjustment of the volume of the volume of authentication attempts may warranted. However, if the likelihood 460 that the user is a rightful holder of the currently active passcode, increases or decreases there may be a need to re-adjust (i.e., increase or decrease) the volume of authentication attempts afforded the user. In specific embodiments of the invention, the user will continue to be afforded authentication attempts as long as the likelihood 460 that the user is a rightful holder of the currently active passcode remains the same or increases (as long as the authentication application 410 determines that the user 120 is making adequate progress in providing the correct passcode (i.e., the active passcode 450).

In further specific embodiments of the invention, in which the volume of authentication is increased or remains unchanged, authentication application 410 is further configured to present the user with passcode remembrance assistance 490. Such passcode remembrance assistance 490 may include, but is not limited to, indication of incorrect character(s) 492 (e.g., highlight those characters that are incorrect), and/or indication of the number/volume of incorrect or correct characters 494. Moreover, passcode remembrance assistance 490 may include an indication of the level of passcode correctness 496 (i.e., a sliding scale/bar graph that indicates the level of passcode correctness, such as a hot vs cold scale or the like). In this regard, passcode remembrance assistance may assist the user 120 in remembering their passcode absent the need to conduct a passcode recovery procedure or otherwise change their passcode. It should be noted that such passcode remembrance assistance 460 only occurs in event that the likelihood that the user is a rightful holder of the currently active passcode exceeds a predetermined passcode remembrance threshold (i.e., a higher likelihood).

Referring to FIG. 5, a flow diagram is depicted of a method 500 for real-time adjustment of a volume of user authentication attempts, in accordance with embodiments of the present invention. At Event 510, a passcode input (i.e., string of alpha-numeric characters) is received from a user that defines an initial authentication attempt for authenticating the user for purposes of gaining access to an application, service, system, physical location or the like.

In response to receiving the passcode input at Event 520, a determination is made that the passcode inputted does not match the currently active passcode (i.e., the stored passcode associated with the authorized user). In response to determining that the inputted passcode does not match the active passcode, mismatched passcode rules are applied/implemented and user authentication behavior patterns (resulting from machine-learning models) are compared to passcode input characteristics to determine a likelihood that the user who inputted the passcode is the rightful/authorized holder of the currently active passcode. The likelihood may be a rating, score or percentage that indicates how likely the user who inputted the passcode is the rightful/authorized holder of the currently active passcode.

At Event 540, the volume of authentication attempts afforded to the user is adjusted from a baseline volume of authentication attempts based on the likelihood that the user who inputted the passcode is the rightful/authorized holder of the currently active passcode. In this regard, if it is less likely that the user who inputted the passcode is the rightful/authorized holder of the currently active passcode the volume of authentication attempts may be decreased or, some instances, decreased to zero (i.e., no further authentication attempts). In the event that the authentication attempts are reduced to zero, the user may be required to perform other authentication means, such as some form of multi-factor authentication and/or may be required to change their active passcode. If it is more likely that the user who inputted the passcode is the rightful/authorized holder of the currently active passcode the volume of authentication attempts may be increased or, as long as the user shows progress in their attempts to provide the current active passcode, the user will continue to receive further authentication attempts (i.e., the volume of authentication attempts may increase by one after each authentication attempt).

In response to the likelihood that the user who inputted the passcode is the rightful/authorized holder of the currently active passcode exceeding a predetermined threshold (i.e., volume of authentication being adjusted upward or, in some instances, remaining unchanged), at optional Event 550, passcode remembrance assistance is presented to the user. Passcode remembrance assistance may include, but is not limited to, an indication of incorrect character(s) (e.g., highlight those characters that are incorrect), and/or indication of the number/volume of incorrect or correct characters. Moreover, passcode remembrance assistance 490 may include an indication of the level of passcode correctness 496, such as a hot/cold indicator scale or the like.

Thus, present embodiments of the invention discussed in detail above, provide for real-time adjustment of the volume/number of passcode entry authentication attempts based on systematic determinations of the likelihood that the passcode entrant is the rightful holder/user of the active passcode. In this regard, after an entered passcode has been determined to be incorrect, a determination is made as to the likelihood that the passcode entrant is the rightful holder of the active passcode and, based on such a determination, the number of authentication attempts afforded the passcode entrant is adjusted. Systematic determination of the likelihood that the passcode entrant is the rightful holder/user of the active passcode is accomplished by applying predetermined mismatched passcode rules and comparing machine learning (ML)-based user authentication behavior patterns to characteristics of the current authentication attempt.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time adjustment of a volume of user authentication attempts, the system comprising:
   a database that stores a plurality of mismatched passcode rules;
   a first computing platform including a first memory and one or more first computing device processors in communication with the first memory, wherein the first memory stores one or more machine learning models that are executable by at least one of the one or more first computing device processors and configured to determine one or more user authentication behavior patterns; and
   a second computing platform including a second memory and one or more second computing device processors in communication with the second memory, wherein the second memory stores an authentication application that is executable by at least one of the one or more second computing device processors and configured to:
   receive, from a user, input of a passcode that defines an initial authentication attempt for authenticating the user for purposes of gaining accessing to an application, a service or a physical location, determine that the passcode does not match a currently active passcode associated with the user, in response to determining that the passcode does not match the currently active passcode, implement the mismatched passcode rules and compare the one or more user authentication behavior patterns to characteristics of the input of the passcode to determine a likelihood that the user is a rightful holder of the currently active passcode, and adjust, from a baseline volume, a volume of further authentication attempts afforded to the user based on the determined likelihood that the user is the rightful holder of the currently active passcode, wherein the authentication application is further configured to provide password remembrance assistance to the user if the determined likelihood exceeds a threshold, wherein the password remembrance assistance can include a number of incorrect characters of the passcode, which characters of the passcode are incorrect, or a level incorrectness of the passcode.

2. The system of claim 1, wherein the mismatched passcode rules include at least one of rules related to (i) common user input errors, (ii) previous passcodes associated with the user, and (iii) proximity in time and location to known times and locations at which the user customarily conducts authentication attempts for gaining accessing to the application, the service or the physical location.

3. The system of claim 1, wherein the one or more machine learning models are configured to determine one or more user authentication behavior patterns, wherein the user authentication behavior pattern is related to a historical rate of errors that the user experiences in providing input of the passcode.

4. The system of claim 1, wherein the one or more machine learning models are configured to determine one or more user authentication behavior patterns, wherein the user authentication behavior pattern is related to at least one of (i) historical speed of input at which a passcode is entered by the user, and (ii) historical amount of pressure applied by the user at point of input when inputting the passcode.

5. The system of claim 1, wherein the one or more machine learning models are configured to determine one or more user authentication behavior patterns, wherein the user authentication behavior pattern is related to historical times and geolocations at which the user customarily conducts authentication attempts for gaining accessing to the application, the service or the physical location.

6. The system of claim 1, authentication application is further configured to:
   receive, from the user, input of a second passcode that defines a subsequent authentication attempt for authenticating the user for purposes of gaining accessing to the application, the service or the physical location,
   determine that the second passcode does not match a currently active passcode associated with the user,
   in response to determining that the second passcode does not match the currently active passcode, implement the mismatched passcode rules and compare the one or more user authentication behavior patterns to characteristics of the input of the second passcode to determine a likelihood that the user is a rightful holder of the currently active passcode, and
   re-adjust the volume of the further authentication attempts afforded to the user based on the determined likelihood that the user is the rightful holder of the currently active passcode.

7. The system of claim 1, wherein the authentication application is configured to adjust, from a baseline volume, a volume of further authentication attempts afforded to the user, wherein the baseline volume is user-specific.

8. The system of claim 7, wherein the authentication application is configured to adjust, from a baseline volume, a volume of further authentication attempts afforded to the user, wherein the baseline volume is user-specific based on a user authentication behavior pattern from amongst the one or more user authentication patterns.

9. The system of claim 1, wherein the authentication application is further configured to adjust, from the baseline volume, a volume of further authentication attempts afforded to the user, wherein adjusting comprises one of increasing or decreasing the volume of further authentication attempts or forbidding further authentication attempts.

10. The system of claim 9, wherein the authentication application is further configured to adjust, from the baseline volume, a volume of further authentication attempts afforded to the user, wherein adjusting comprises forbidding further authentication attempts and the authentication is further configured to perform at least one of requiring the user to (i) successfully perform a multi-factor authentication process to gain access accessing to the application, the service or the physical location, and (ii) change the currently active passcode.

11. A computer-implementing method for real-time adjustment of a volume of user authentication attempts, the method executed by one or more computing processor devices and comprising:
    receiving, from a user, input of a passcode that defines an initial authentication attempt for authenticating the user for purposes of gaining accessing to an application, a service or a physical location;
    determining that the passcode does not match a currently active passcode associated with the user;
    in response to determining that the passcode does not match the currently active passcode, implementing mismatched passcode rules and comparing one or more user authentication behavior patterns resulting from machine learning models to characteristics of the input of the passcode to determine a likelihood that the user is a rightful holder of the currently active passcode; and
    adjusting, from a baseline volume, a volume of further authentication attempts afforded to the user based on the determined likelihood that the user is the rightful holder of the currently active passcode, wherein the authentication application is further configured to provide password remembrance assistance to the user if the determined likelihood exceeds a threshold, wherein the password remembrance assistance can include a number of incorrect characters of the passcode, which characters of the passcode are incorrect, or a level incorrectness of the passcode.

12. The computer-implemented method of claim 11, wherein comparing the one or more user authentication behavior patterns resulting from machine learning models to characteristics of the input of the passcode further comprises comparing the one or more user authentication behavior patterns including a user authentication behavior pattern related to at least one of (i) a historical rate of errors that the user experiences in providing input of the passcode, (ii) historical speed of input at which a passcode is entered by the user, (iii) historical amount of pressure applied by the user at point of input when inputting the passcode, and (iv) historical times and geolocations at which the user customarily conducts authentication attempts for gaining accessing to the application, the service or the physical location.

13. A computer program product comprising: a non-transitory computer-readable medium comprising sets of codes for causing one or more computing processing devices to:
    receive, from a user, input of a passcode that defines an initial authentication attempt for authenticating the user for purposes of gaining accessing to an application, a service or a physical location;
    determine that the passcode does not match a currently active passcode associated with the user;
    in response to determining that the passcode does not match the currently active passcode, implement mismatched passcode rules and compare one or more user authentication behavior patterns resulting from machine learning models to characteristics of the input of the passcode to determine a likelihood that the user is a rightful holder of the currently active passcode; and
    adjust, from a baseline volume, a volume of further authentication attempts afforded to the user based on the determined likelihood that the user is the rightful holder of the currently active passcode, wherein the authentication application is further configured to provide password remembrance assistance to the user if the determined likelihood exceeds a threshold, wherein the password remembrance assistance can include a number of incorrect characters of the passcode, which characters of the passcode are incorrect, or a level incorrectness of the passcode.

14. The computer program product of claim 13, wherein the set of codes for causing the one or more processors to compare the one or more user authentication behavior patterns resulting from machine learning models to characteristics of the input of the passcode are further configured to cause the one or more processors to compare the one or more user authentication behavior patterns including a user authentication behavior pattern related to at least one of (i) a historical rate of errors that the user experiences in providing input of the passcode, (ii) historical speed of input at which a passcode is entered by the user, (iii) historical amount of pressure applied by the user at point of input when inputting the passcode, and (iv) historical times and geolocations at which the user customarily conducts authentication attempts for gaining accessing to the application, the service or the physical location.

* * * * *